US012158386B2

(12) United States Patent
Wiles (10) Patent No.: US 12,158,386 B2
(45) Date of Patent: Dec. 3, 2024

(54) APPARATUS AND METHOD OF CALIBRATING OF A FORCE SENSING DEVICE BY ESTABLISHING AN OPTIMIZED FORCE-RESISTANCE CURVE

(71) Applicant: PERATECH IP LTD, North Yorkshire (GB)

(72) Inventor: Timothy Peter Wiles, North Yorkshire (GB)

(73) Assignee: Peratech IP Ltd, North Yorkshire (GB)

( * ) Notice: Subject to any disclaimer, the term of this patent is extended or adjusted under 35 U.S.C. 154(b) by 0 days.

(21) Appl. No.: 17/553,905

(22) Filed: Dec. 17, 2021

(65) Prior Publication Data
US 2022/0196499 A1    Jun. 23, 2022

(30) Foreign Application Priority Data
Dec. 17, 2020    (GB) .................................... 2019938

(51) Int. Cl.
    *G01L 5/00*        (2006.01)
    *G01L 1/22*        (2006.01)
(52) U.S. Cl.
    CPC .............. *G01L 5/0066* (2013.01); *G01L 1/22* (2013.01)
(58) Field of Classification Search
CPC ... G01L 25/00; G01L 5/00; G01L 1/00; G06F 3/045; G06F 3/04144; G06F 3/0418
See application file for complete search history.

(56) References Cited

U.S. PATENT DOCUMENTS

| 6,218,966 B1* | 4/2001 | Goodwin | G06F 3/0202 341/20 |
| 7,158,122 B2* | 1/2007 | Roberts | G06F 3/0418 345/173 |
| 7,333,109 B2* | 2/2008 | Grandine | G06T 11/203 345/442 |
| 7,844,414 B2* | 11/2010 | Kalinin | G01D 18/008 702/199 |
| 8,279,180 B2* | 10/2012 | Hotelling | G06F 3/0443 345/173 |

(Continued)

FOREIGN PATENT DOCUMENTS

| GB | 2455587 A | 6/2009 |
| GB | 2484090 A | 4/2012 |

(Continued)

OTHER PUBLICATIONS

Corresponding Great Britain Patent Application GB20109938.6, Search Report dated Jun. 21, 2021. 1 page.

*Primary Examiner* — Tran M. Tran
(74) *Attorney, Agent, or Firm* — Cooper Legal Group LLC (57) ABSTRACT

A method of calibrating a force sensing device comprises establishing an optimized force-resistance curve by obtaining a mean resistance of a plurality of force-resistance curves for a set of substantially similar force sensing devices and measuring calibration data of the force sensing device. The method applies a plurality of calibration points defined from the measuring step to the optimized force-resistance curve and adapts the optimized force-resistance curve to form an adapted force-resistance curve by interpolating the plurality of calibration points and determining a multiplier value for each calibration point.

15 Claims, 10 Drawing Sheets

(56) References Cited

U.S. PATENT DOCUMENTS

| | | | |
|---|---|---|---|
| 8,482,517 B1* | 7/2013 | O'Keeffe | G06F 3/033 |
| | | | 345/157 |
| 8,711,129 B2* | 4/2014 | Hotelling | G06F 3/0418 |
| | | | 345/173 |
| 8,847,900 B2* | 9/2014 | Philipp | G06F 3/045 |
| | | | 345/173 |
| 9,007,322 B1* | 4/2015 | Young | G06F 3/0418 |
| | | | 345/173 |
| 9,182,845 B2* | 11/2015 | Lussey | G06F 3/04146 |
| 9,442,594 B2* | 9/2016 | Graham | H03K 17/962 |
| 9,500,552 B2* | 11/2016 | Williams | G01L 1/205 |
| 10,001,894 B2* | 6/2018 | Papakostas | G06F 3/045 |
| 10,126,185 B2* | 11/2018 | Watanabe | G01L 1/20 |
| 10,198,133 B2* | 2/2019 | Wang | G06F 3/0445 |
| 10,395,860 B2* | 8/2019 | Towers | H01H 13/52 |
| 10,852,875 B2* | 12/2020 | Routley | G06F 3/04146 |
| 10,928,947 B2* | 2/2021 | Micci | G01L 1/16 |
| 11,221,703 B2* | 1/2022 | Routley | G06F 3/0446 |
| 11,249,575 B2* | 2/2022 | Micci | G06F 3/04166 |
| 11,494,031 B2* | 11/2022 | Sheng | G06F 3/045 |
| 11,513,019 B2* | 11/2022 | Lindemann | G06F 3/0418 |
| 11,526,210 B2* | 12/2022 | Wang | G06F 3/011 |
| 11,635,336 B2* | 4/2023 | Afentakis | G01L 1/205 |
| | | | 73/862.627 |
| 11,867,666 B2* | 1/2024 | Fischer | G01N 3/46 |
| 2006/0293864 A1* | 12/2006 | Soss | G06F 3/04144 |
| | | | 702/104 |
| 2010/0265208 A1* | 10/2010 | Kim | G06F 3/044 |
| | | | 445/24 |
| 2013/0278578 A1* | 10/2013 | Vetsuypens | G09G 5/02 |
| | | | 345/207 |
| 2017/0242539 A1* | 8/2017 | Mani | G06F 3/0418 |
| 2018/0081482 A1* | 3/2018 | Gui | G06F 3/04144 |
| 2022/0374124 A1* | 11/2022 | Wiles | G06F 3/0416 |

FOREIGN PATENT DOCUMENTS

| | | |
|---|---|---|
| GB | 2484203 A | 4/2012 |
| WO | 2020169943 A1 | 8/2020 |

* cited by examiner

APPARATUS AND METHOD OF CALIBRATING OF A FORCE SENSING DEVICE BY ESTABLISHING AN OPTIMIZED FORCE-RESISTANCE CURVE

CROSS REFERENCE TO RELATED APPLICATIONS

This application claims priority from United Kingdom Patent Application number GB 20 19 938.6, filed on 17 Dec. 2020, the whole contents of which are incorporated herein by reference.

BACKGROUND OF THE INVENTION

The present invention relates to a method of calibrating a force sensing device and apparatus for measuring a mechanical interaction.

Force sensing devices are utilized in a number of real-world applications and are often incorporated into electronic devices such as those including touch screens. Force sensing devices are typically used to calculate a magnitude or position of applied force to the touch screen, for example, and, generally, it is important to reduce the margin of error in the applied force calculated in these applications to ensure a response is consistent with a user's input.

In calibrating force sensing devices, in particular those fitted into electronic devices, the force-resistance output, represented by force-resistance curves, varies due to a number of factors. These factors include the design of the force sensing device itself, the design of the actuator and the integration of the force sensing device into the electronic device. The integration of the force sensing device can vary the force-resistance curve depending on the level of preload applied, the force transfer from the electronic device to the force sensing device and the number of materials positioned between the force sensing device and the force applied.

Thus, these problems can result in an increase in force error, given that the force error of the force sensing device initially may be reasonable and, for example, around ten percent (10%), the preload, for example, can result in an increase to around fifty percent (50%) error. This can be further compounded if when a force is applied, transfer of the force is lost through the electronic device.

Thus, there remains a need to provide an appropriate calibration process which reduces these errors of incorporating force sensing devices into real world applications and corresponding electronic devices.

BRIEF SUMMARY OF THE INVENTION

According to a first aspect of the present invention, there is provided a method of calibrating a force sensing device, comprising the steps of: establishing an optimized force-resistance curve by obtaining a mean resistance of a plurality of force-resistance curves for a set of substantially similar force sensing devices; measuring calibration data of said force sensing device; applying a plurality of calibration points defined from said measuring step to said optimized force-resistance curve; and adapting said optimized force-resistance curve to form an adapted force-resistance curve by utilizing interpolating said plurality of calibration points and determining a multiplier value for each said calibration point.

According to a second aspect of the present invention, there is provided an apparatus for measuring a mechanical interaction, comprising: a force sensing device comprising a first conductive layer, a second conductive layer and a pressure sensitive layer between said first conductive layer and said second conductive layer; and a processor configured to: establish an optimized force-resistance curve by obtaining a mean resistance of a plurality of force-resistance curves for a set of substantially similar force sensing devices; measure calibration data of said force sensing device; apply a plurality of calibration points defined from said measuring step to said optimized force-resistance curve; and adapt said optimized force-resistance curve to form an adapted force-resistance curve by utilizing interpolating said plurality of calibration points and determining a multiplier value for each said calibration point.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
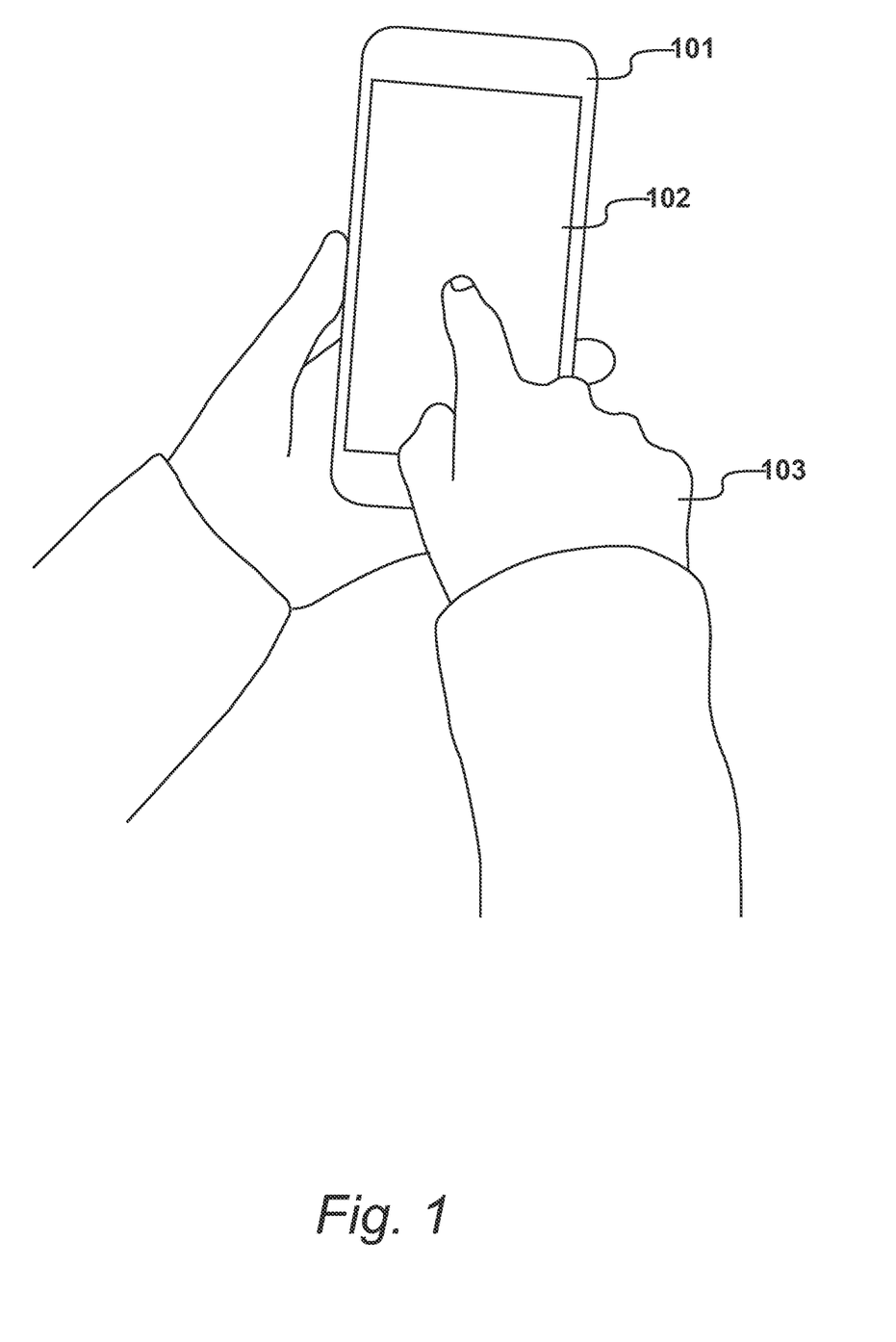
FIG. 1 shows an electronic device in the form of a mobile telephone.

FIG. 1

FIG. 1 illustrates an electronic device 101 which in this illustrated embodiment is a mobile telephone. In the embodiment, mobile telephone 101 comprises a touch screen 102 which includes a force sensing device which is configured to receive inputs from an operative 103. In use, operative 103 may apply a force to touch screen 102 by means of their finger.

Electronic device 101 may comprise any suitable electronic device such as a mobile telephone, tablet, personal computer, or other similar electronic device.

Figure 2:
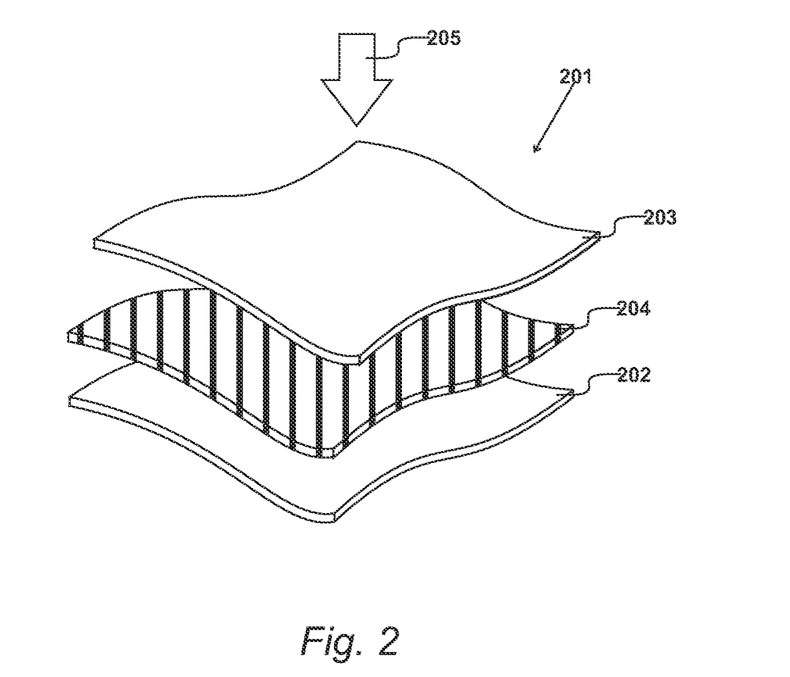
FIG. 2 shows an example force sensing device which may be utilized in the electronic device of FIG. 1.

FIG. 2

An example force sensing device 201 which may be utilized in electronic device 101 is shown in FIG. 2.

Force sensing device 201 comprises a first conductive layer 202, a second conductive layer 203 and a pressure sensitive layer 204. In the embodiment, pressure sensitive layer 204 between first conductive layer 202 and second conductive layer 203.

In the embodiment, force sensing device 201 is a force resistive sensor. Pressure sensitive layer 204 comprises a material which exhibits a change in resistance in response to an applied force. In the embodiment, pressure sensitive layer 204 comprises a quantum tunnelling composite material.

In use, a force 205 may be applied to conductive layer 203, and, when connected to an electric circuit, a current may be transmitted from conductive layer 203 to conductive layer 202 via pressure sensitive layer 204 as the layers are brought together through the application of force 205. In this way, the position and magnitude of applied force 205 can be measured from the force sensing device.

In calibration, an output from the force sensing device produces a force-resistance curve indicating the properties of the force sensing device in combination with the electronic device. It is important that the output is consistent with the application of force 205 made to the force sensing device in use to ensure that any further outputs, such as operations relating to applications running on electronic device 101, operate effectively.

Thus, the aim is to provide an optimized curve for a given set of related force-resistance curves. This optimized curve is intended to minimize the force error applied and the method described herein looks to provide a force-resistance curve as close to a 'golden curve' as possible. In this way, the force error in the application of force and corresponding output can be reduced.

Figure 3:
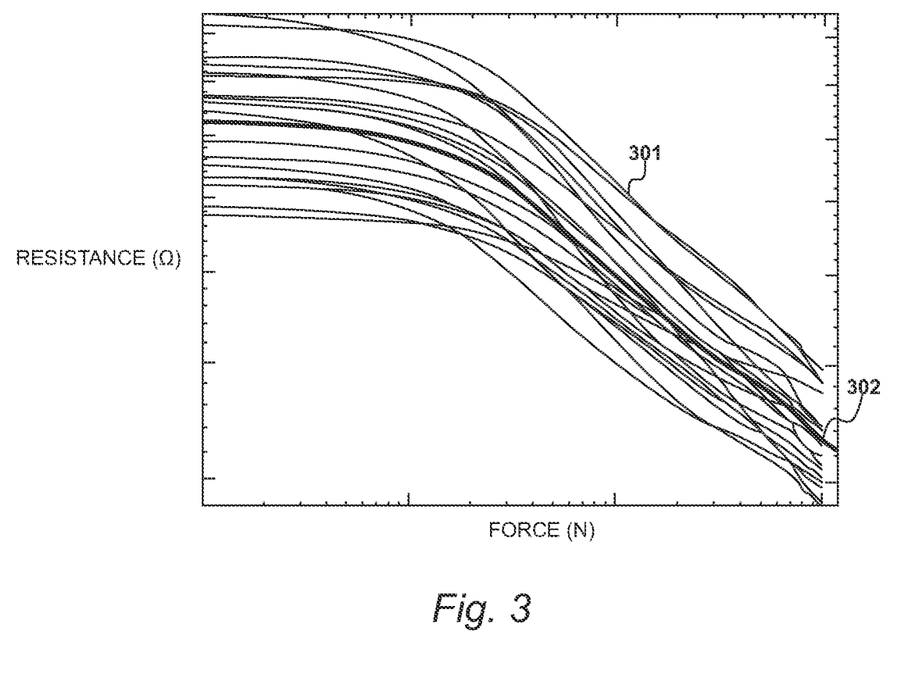
FIG. 3 shows an optimized curve in relation to a set of force sensing devices of substantially similar design or arrangement.

FIG. 3

FIG. 3 illustrates an optimized curve in relation to a set of force sensing devices of substantially similar design or arrangement.

FIG. 3 shows a plurality of force-resistance curves 301 for a set of 20 force-resistance devices in an example with zero point five Newtons (0.5N) of preload applied. As can be seen, each force sensing device varies in terms of the output on a force-resistance curve.

Each of the force sensing devices for each of the force-resistance curves are substantially similar to the force sensing device described in FIG. 2. However, variability in each of the force sensing devices exists in the force-resistance output.

As further illustrated in FIG. 3, an optimized force-resistance curve 302 is shown which corresponds to the plurality of force sensing devices corresponding to the plurality of force-resistance curves 301 shown.

The optimized force-resistance curve is calculated by obtaining the mean resistance at each value of force. Thus, an optimized force-resistance curve is one in which the force-resistance curve minimizes the force error when obtaining a measured force from a measured resistance for the force sensing device. When calculating a traditional optimized 'golden' curve the plurality of force sensing devices typically utilized is between twenty and one hundred force sensing devices which gives a reasonable estimate of a true optimized force-resistance curve. While this optimized curve is a reasonable starting point for suitable calibration, limitations in its accuracy exist.

If the optimized force-resistance curve 302 is utilized for calibration with no force sensing device calibration, the input force measured in use deviates from the actual force applied by an operative. In conventional applications of this type, force error values in excess of two hundred and fifty percent (250%) at low forces, and as much as one hundred percent (100%) for other forces when applied to the other force sensing devices in question are obtained. Thus, in order to obtain a force error in a final force sensing device in a preferred region, i.e., under twenty five percent (25%), the invention seeks to modify this modified curve, as will be described.

Figure 4:
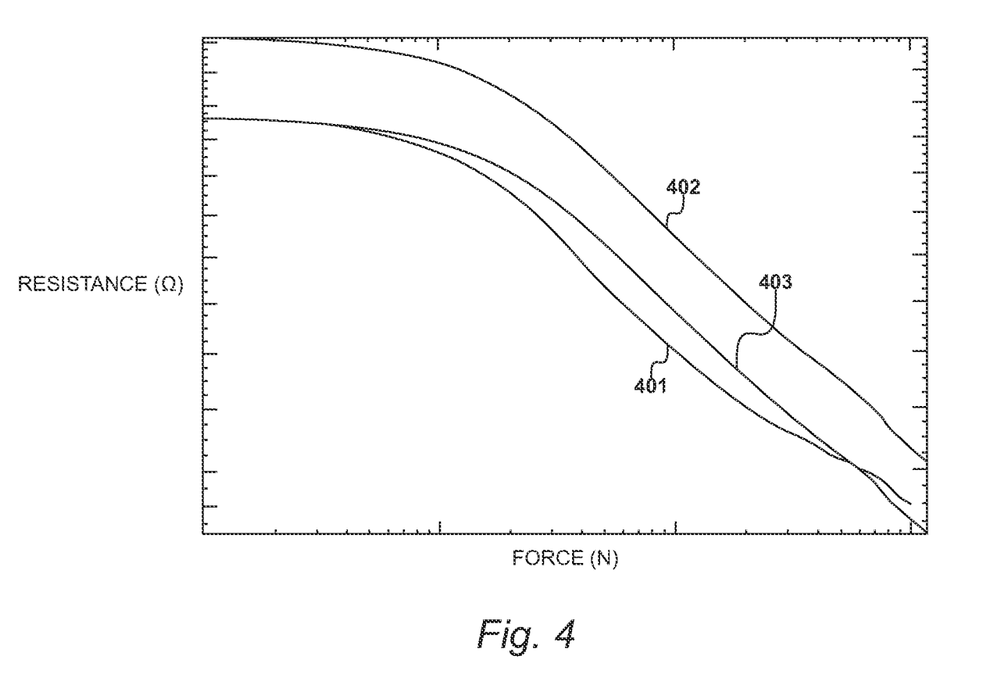
FIG. 4 shows a force-resistance curve derived from measurement of calibration data.

FIG. 4

In order to reduce the force error associated with the optimized force-resistance curve 302 of FIG. 3, a measurement of calibration data of each force sensing device produces the force-resistance curve shown in FIG. 4.

In this example embodiment, each force sensing device in the set undertakes a simple test to produce a more accurate force-resistance curve. In this embodiment, a single calibration data point is taken from each force sensing device to produce the results as shown.

FIG. 4 shows a force-resistance curve 401 which illustrates the data obtained from testing a single force sensing device using one calibration data point at a given force applied. Force-resistance curve 402 represents the original optimized force-resistance curve, which may be substantially similar to optimized force-resistance curve 302.

Utilizing the calibration data measured in respect of force-resistance curve 401, an adapted force-resistance curve 403 is produced which conforms more accurately to the test output of force-resistance curve 401. Thus, as can be seen, the force error compared to the conventional optimized force-resistance curve 402 has been reduced. Thus, in this way, the force error can be significantly reduced when this same process is utilized for a plurality of force sensing devices such as those utilized in FIG. 3.

Figure 5:
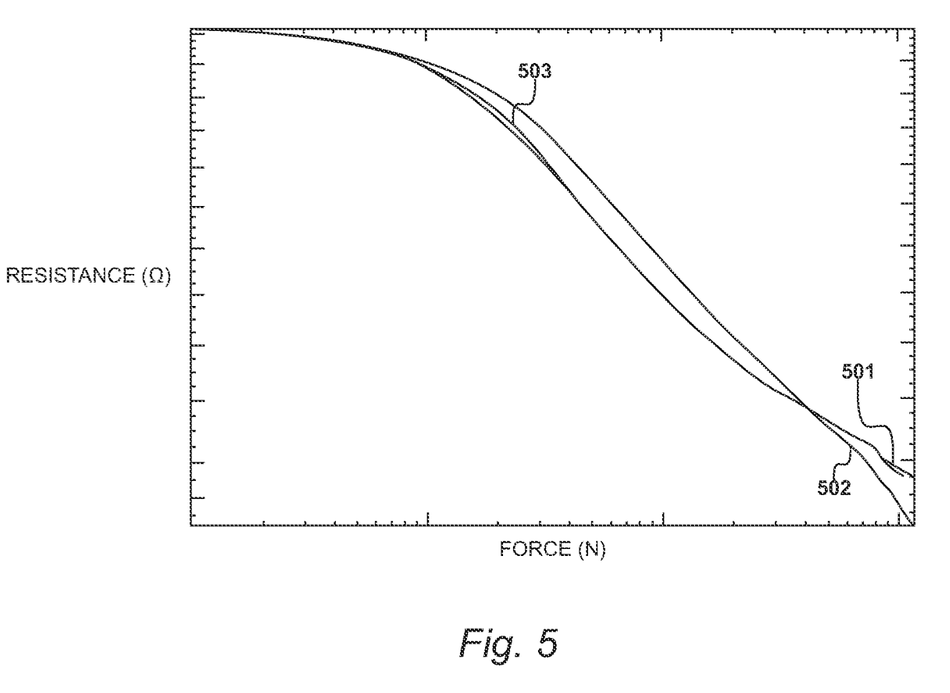
FIG. 5 shows a single calibration data point used to move adapted optimized force-resistance curve closer to the data measured.

FIG. 5

FIG. 4 illustrates a single calibration data point being utilized which works to move the adapted optimized force-resistance curve closer to the data measured directly from the force sensing device in question. An increased number of calibration data points can produce even more accurate results. In an embodiment, two calibration data points have been shown to impact on the gradient of a force-resistance curve ensuring that the force-resistance curve in question can be further optimized.

In FIG. 5, additional calibration data points are utilized in order to produce further adaptation of the original optimized curve. FIG. 5 illustrates the data from a force sensing device producing a force-resistance curve 501. Use of three calibration data points results in a force-resistance curve 502. By including a fourth calibration data point, force-resistance curve 503 can be produced which shows increased conformity with the force-resistance curve initially measure. In particular, by utilizing four calibration data points, the adapted optimized force-resistance curve adjusts the original optimized curve by means of its curvature, gradient and offset. Thus, four calibration data points is a suitable number for both accuracy and practicality.

The process utilized incorporates a method known as Piecewise Cubic Hermite Interpolating Polynomial (PCHIP) which allows for localized cubic interpolations to be undertaken between a pair of data points. This process will be described further with respect to FIG. 8.

Figure 6:
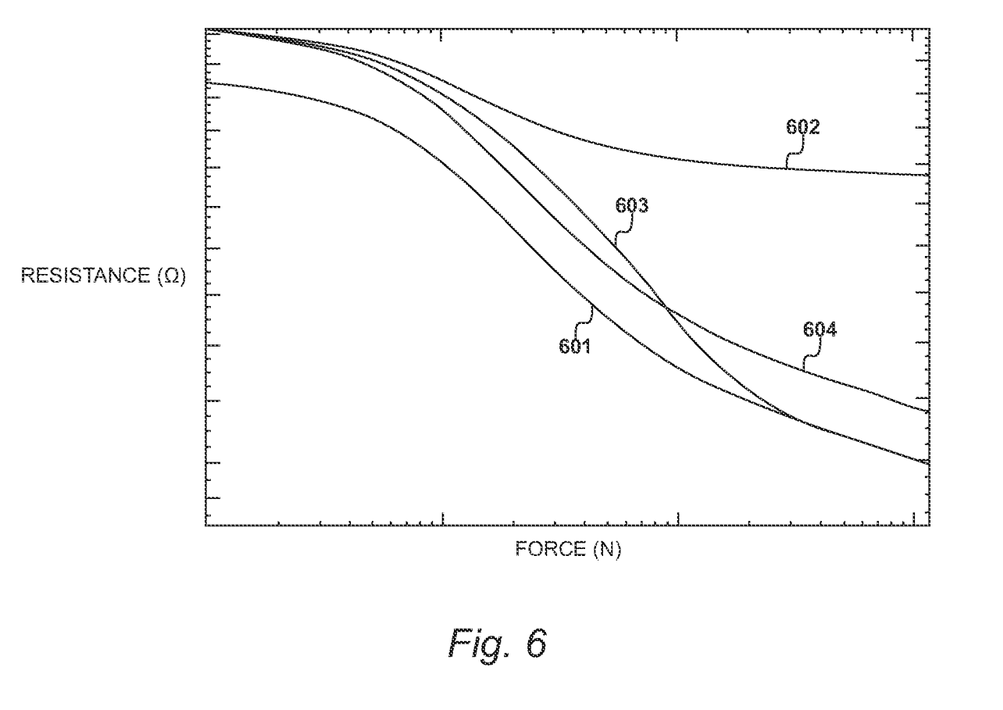
FIG. 6 shows a force-resistance curve highlighting the effects of a variable pre-load.

FIG. 6

In addition to producing the adapted optimized force-resistance curve by introducing additional calibration data points to adapt the optimized force-resistance curve, further factors including the effect of pre-load are incorporated into the process.

In the examples shown in FIGS. 4 and 5, the examples assumed a similar pre-load of each of the force sensing devices in question. In a realistic scenario, pre-load can differ, and further calibration can be desirable to account for variable pre-loads encountered. In particular, a variable pre-load can lead to an increased force error when utilizing a standard optimized force-resistance curve.

FIG. 6 illustrates a force-resistance curve and the effects of introducing a variable pre-load into the calibration process. In the embodiment, four calibration data points are utilized in the adapted optimized force-resistance curve in a similar manner to that of FIG. 5 which accounts for the main differences between each force sensing device.

In real-world applications, over the lifetime of the electronic device incorporating the force sensing device, changes occur in the pre-load after the initial calibration in line with that of FIG. 5. It is not practical to return the device for repeated calibration, however, the calibration method herein determines a single calibration data point at a zero applied force for an operative.

In this way, if the system can determine a situation in which the operative is not applying a force to the electronic device and force sensing device, a measurement of resistance can be calculated from the force sensing device and compared with the original calibration data point at zero applied force.

Thus, adjustments to the calibration, such as a fixed resistance offset, a proportional resistance offset, or a graduated resistance offset can be made dependent on the force applied.

FIG. 6 therefore illustrates the further adaptation of the optimized force-resistance curve in response to a variable pre-load.

The original adapted optimized curve 601 is consistent with curve 503, for example, shown in FIG. 5. Force-resistance curve 602 shows the effect of applying a fixed offset. Force-resistance curve 603 applies a graduated offset and force-resistance curve 604 applies a proportional offset. Consequently, the force-resistance curves illustrate that a preferred adaptation is a combination of the graduated and proportional offset force-resistance curves 603 and 604.

Figure 7:
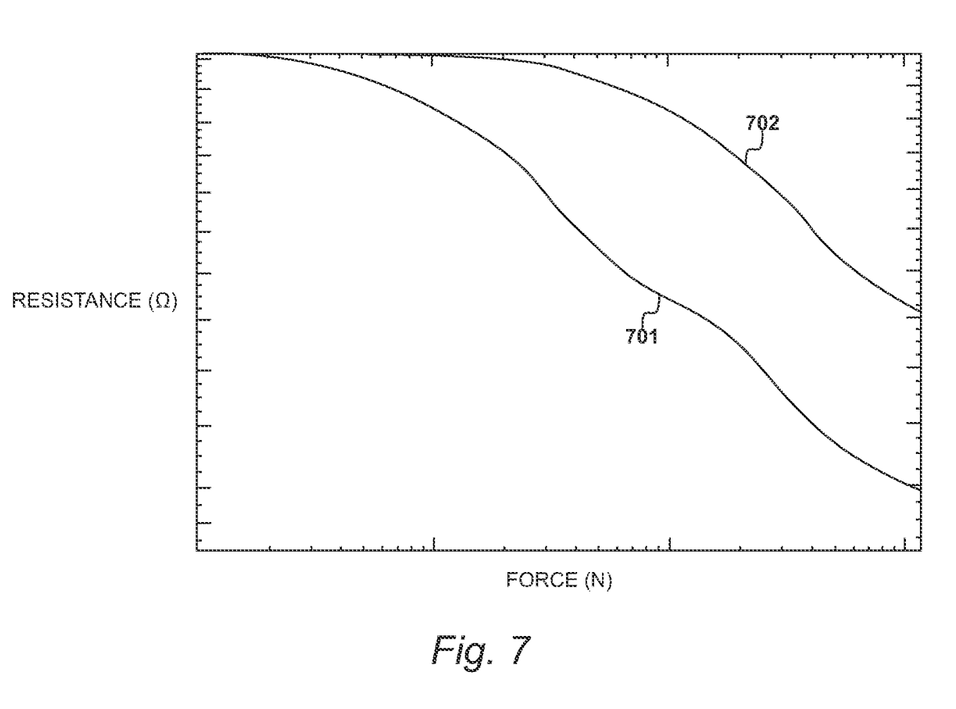
FIG. 7 shows the variation in force transfer in respect of a force-resistance curve.

FIG. 7

FIG. 7 illustrates the variation of force transfer in respect of a force-resistance curve. In FIG. 7, force-resistance curve 701 illustrates the effect on the force-resistance curve when force transfer of the applied force to the force sensing device is around ten percent (10%) efficiency. In contrast, force-resistance curve 702 illustrates a force-resistance curve that would be expected if all of the force applied by an operative was transferred fully to the force sensing device. Thus, it can be seen that the force transfer efficiency, or lack thereof, results in the force-resistance curve being translated to the right by a factor of ten. Again, the method further adapts the force-resistance curve to reduce this error.

Figure 8:
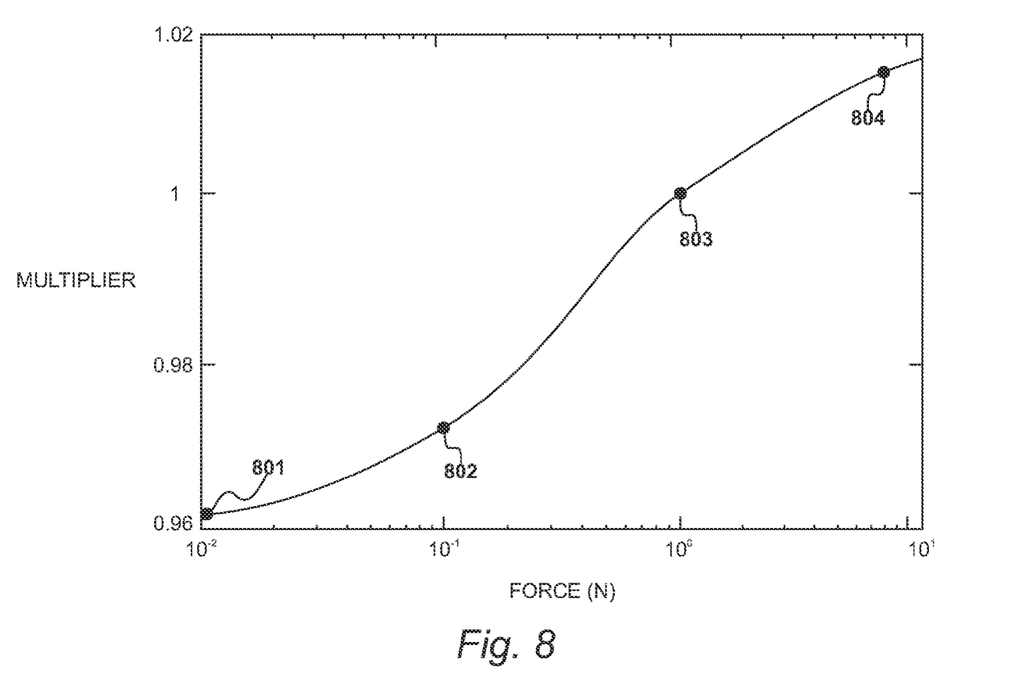
FIG. 8 shows a force multiplier curve used to adjust the optimized force-resistance curve.

FIG. 8

As noted previously, the method utilizes Piecewise Cubic Hermite Interpolating Polynomial (PCHIP) which allows for localized cubic interpolations to be undertaken between a pair of data points.

In the embodiment, the PCHIP process takes four predetermined forces on the force-resistance curve and records the difference between the optimized force-resistance curve and the actual force-resistance curve of the electronic device incorporating the force sensing device.

As shown in FIG. 8, four multipliers or differences are obtained as illustrated at points 801, 802, 803 and 804. The force multiplier curve therefore provides a means to adjust the optimized force-resistance curve to fit the electronic device and force sensing device combination. Thus, the multiplier points 801, 802, 803 and 804 can then be used by means of the PCHIP interpolation. The multiplier value at each value of force can be determined.

Multiplier values are determined by measuring the resistance in the force sensing device incorporated into an electronic device build at four pre-determined forces and comparing these with the optimized curve resistances. PCHIP interpolation can then predict the value of the multiplier at all forces based around the four sampling point multipliers.

In the embodiment, the first calibration data point is always fixed and determined to be at the lowest force. This provides an effective anchor to the adapted optimized force-resistance curve, thereby assisting with the PCHIP interpolation. The remaining three multiplier data points are determined on the basis of the force range of the force sensing device. The PCHIP function provides a prediction which allows a suitable look-up table to be created where a value of the multiplier is obtained for each force value that is to be included in the look up table.

It is appreciated that alternative forms of interpolation which allow for localized interpolation between two corresponding data points may be utilized as an alternative to PCHIP interpolation. This may include forms of piecewise, linear, polynomial or spline interpolation, for example.

Figure 9:
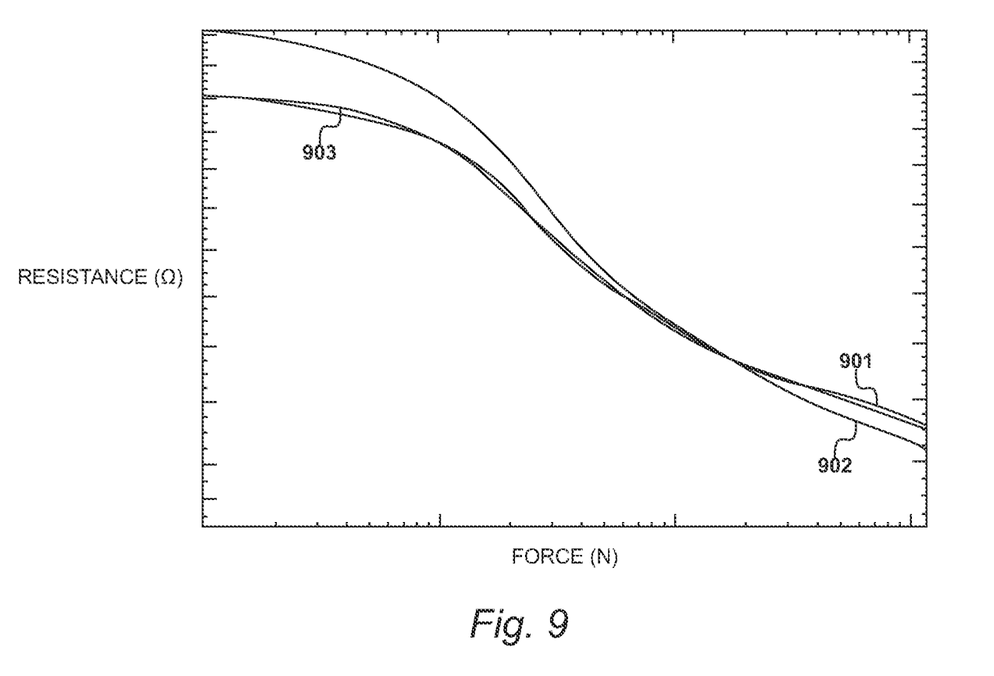
FIG. 9 shows a measured force-resistance curve, a corresponding optimized force-resistance curve, and an adapted optimized force-resistance curve in accordance with the present invention.

FIG. 9

FIG. 9 shows an actual force-resistance curve 901 measured from the electronic device in combination with the force sensing device, a corresponding optimized force-resistance curve 902, and an adapted optimized force-resistance curve 903 based on the interpolation method described in FIG. 8.

It can be seen that force-resistance curve 902 and force-resistance curve 903 show close proximity indicating a much closer prediction for real-world results.

Figure 10:
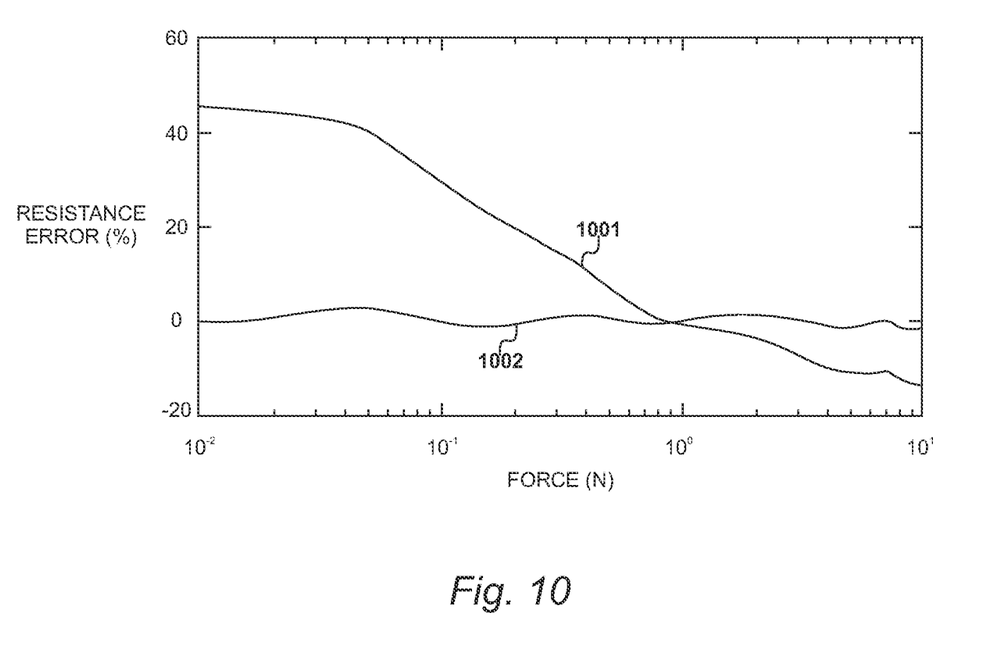
FIG. 10 shows an illustration of the percentage resistance error for a given force.

FIG. 10

Using the example of FIGS. 8 and 9, an illustration of the percentage resistance error for a given force is shown in FIG. 10. Force-resistance curve 1001 illustrates the conventional optimized force-resistance curve and the percentage of resistance error associated with utilizing this force-resistance curve. In this illustration, at low forces, the resistance error may be as high as fifty percent (50%). In contrast, force-resistance curve 1002 illustrating the resistance error for the adapted force-resistance curve shows a more consistent error of a maximum percentage error of between minus two and three percent (−2 and 3%).

Thus, the invention provides a substantial reduction to the force error observed in an electronic device by following the calibration method and, experimental data has indicated that the force error may reduce from a triple digit percentage to a single digit percentage.

The invention indicates that the preload variation, preload increases can be calibrated out of the system, and preload decreases can be accounted for through a single automatic zero force calibration outside of factory conditions with a representative force error of no greater than twenty five percent (25%).

The invention claimed is:

1. A method of calibrating a force sensing device, comprising the steps of:

measuring first calibration data for a set of substantially similar force sensing devices;

deriving a plurality of force-resistance curves from said first calibration data, each one of said plurality of force-resistance curves corresponding to one force sensing device in said set of substantially similar force sensing devices;

establishing an optimized force-resistance curve by obtaining a mean resistance of said plurality of force-resistance curves;

measuring second calibration data of said force sensing device;

defining a plurality of calibration points from said second calibration data;

applying said plurality of calibration points to said optimized force-resistance curve;

adapting said optimized force-resistance curve to form an adapted force-resistance curve by interpolating said plurality of calibration points and determining a multiplier value for each calibration point of said plurality of calibration points; and calibrating said force sensing device from said adapted force-resistance curve.

2. The method of claim 1, wherein said plurality of calibration points is three or more.

3. The method of claim 1, wherein said plurality of calibration points is four.

4. The method of claim 1, wherein said method provides a maximum force error of twenty-five percent.

5. The method of claim 1, further comprising the step of:
applying a preload to an electronic device comprising said force sensing device.

6. The method of claim 1, wherein said force sensing device comprises a first conductive layer, a second conductive layer, and a pressure sensitive layer positioned between said first conductive layer and said second conductive layer.

7. The method of claim 6, wherein said pressure sensitive layer comprises a quantum tunnelling material.

8. The method of claim 1, wherein said plurality of calibration points adapt said optimized force-resistance curve by gradient, curvature, or offset of said optimized force-resistance curve such that said plurality of calibration points are in close proximity to a measured force sensing device data force-resistance curve.

9. The method of claim 1, wherein said step of adapting comprises:
measuring a resistance in said force sensing device at a plurality of predetermined forces to determine an actual force-resistance curve for said force sensing device; and
recording a difference between said optimized force-resistance curve and said actual force-resistance curve.

10. The method of claim 1, wherein said method utilizes Piecewise Cubic Hermite Interpolating Polynomial (PCHIP) to adapt said optimized force-resistance curve into said adapted force-resistance curve.

11. The method of claim 1, further comprising the steps of:
measuring a resistance from said force sensing device when no force is applied;
comparing said measured resistance with a predetermined zero force-resistance measurement; and
providing further adaptation of said optimized force-resistance curve to account for a difference between said measured resistance and said predetermined zero force-resistance measurement.

12. Apparatus for measuring a mechanical interaction, comprising:
a force sensing device comprising a first conductive layer, a second conductive layer, and a pressure sensitive layer between said first conductive layer and said second conductive layer; and
a processor configured to:
measure first calibration data for a set of substantially similar force sensing devices;
derive a plurality of force-resistance curves from said first calibration data, each one of said plurality of force-resistance curves corresponding to one force sensing device in said set of substantially similar force sensing devices;
establish an optimized force-resistance curve by obtaining a mean resistance of said plurality of force-resistance curves;
measure second calibration data of said force sensing device;
define a plurality of calibration points from said second calibration data;
apply said plurality of calibration points to said optimized force-resistance curve;
adapt said optimized force-resistance curve to form an adapted force-resistance curve by interpolating said plurality of calibration points and determining a multiplier value for each calibration point of said plurality of calibration points; and
calibrate said force sensing device from said adapted force-resistance curve.

13. The apparatus of claim 12, wherein said pressure sensitive layer comprises a quantum tunnelling material.

14. The apparatus of claim 12, wherein said apparatus is incorporated into an electronic device.

15. The apparatus of claim 14, wherein said electronic device comprises a touch screen.

* * * * *